Patented May 29, 1923.

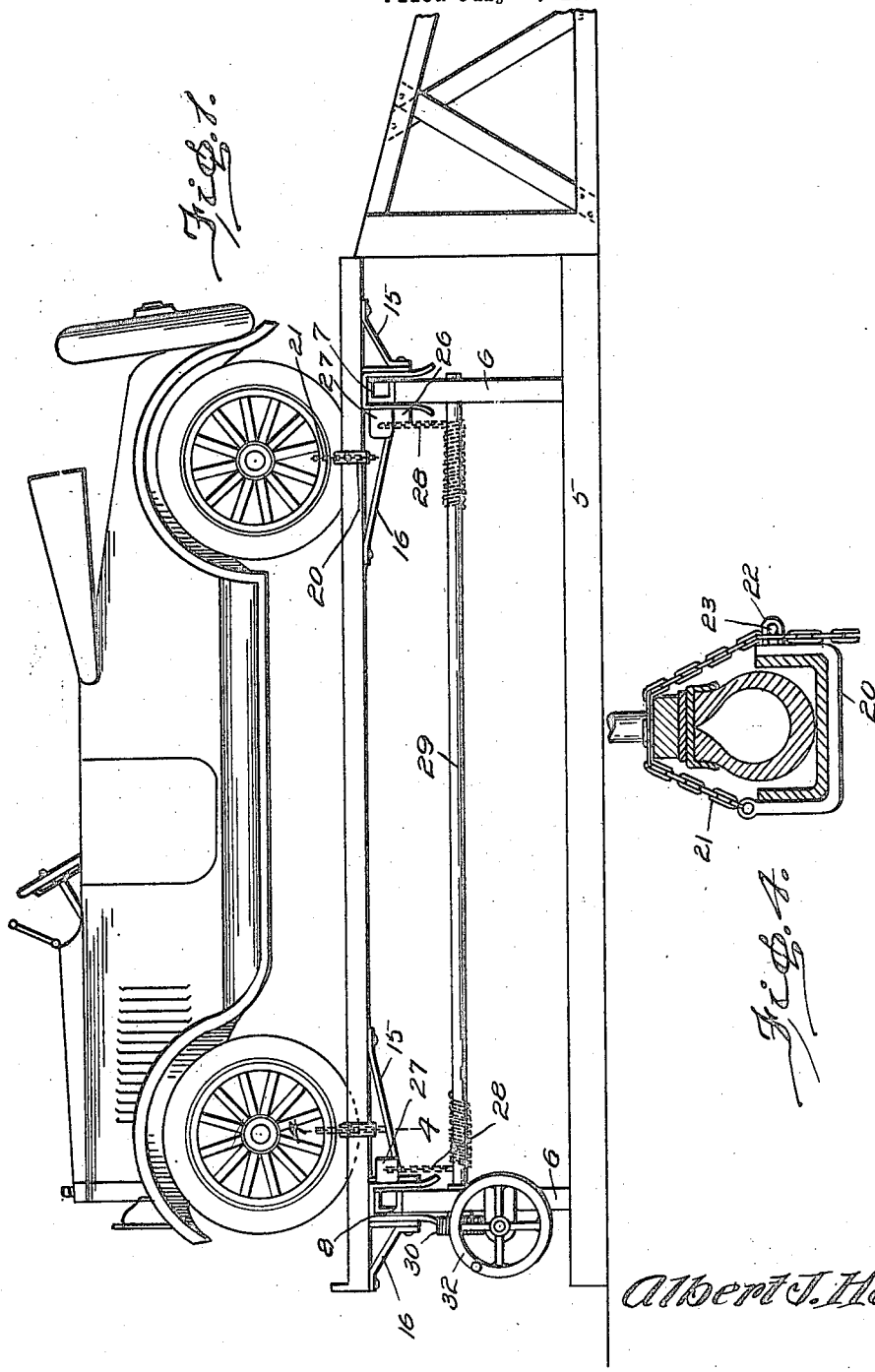

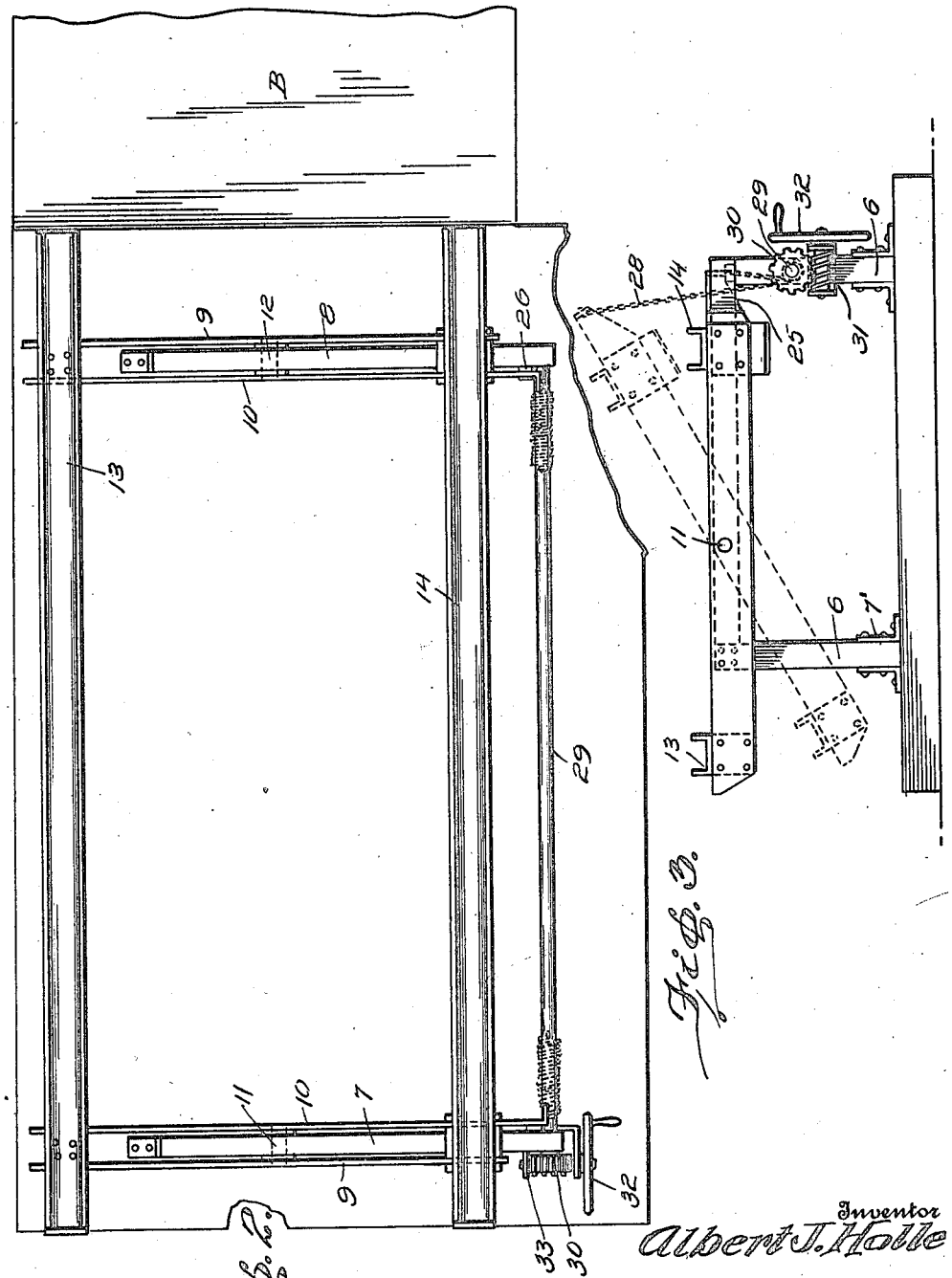

1,456,593

UNITED STATES PATENT OFFICE.

ALBERT J. HOLLE, OF RUSHFORD, MINNESOTA.

MOTOR-VEHICLE TILTING APPARATUS.

Application filed July 6, 1921. Serial No. 482,752.

*To all whom it may concern:*

Be it known that I, ALBERT J. HOLLE, a citizen of the United States, residing at Rushford, in the county of Fillmore and State of Minnesota, have invented certain new and useful Improvements in a Motor-Vehicle Tilting Apparatus, of which the following is a specification.

This invention relates to automobile tilting or turning mechanisms whereby a motor vehicle may be raised or tilted in various angular positions to permit easy access to the operating mechanism thereof.

The primary object of the invention resides in the construction of a novel and improved tilting mechanism for motor vehicles, whereby pits or dug outs may be dispensed with in order to easily gain access to the operating mechanism beneath the vehicle, and thus affording provision whereby the mechanism may be disposed so as to expose the bottom of the motor vehicle to the light.

Another very important object of the invention resides in the construction of a tilting mechanism having a runway or track, including adjustable means for attaching and securing the wheels of various sized machines thereto, preliminary to the tilting of the machine, so that the workman or repair man may easily gain access to the operating mechanism beneath the said vehicle.

A still further object of the invention is the construction of a new and improved motor vehicle tilting mechanism having manually operable gearing for tilting the vehicle to the desired angle and lock the same in its set position raised from the ground to permit a workman to gain access to the various parts thereof and permit the manipulation of tools and otherwise give the workman sufficient working space in and about the machine to be repaired.

The invention will be best understood from a consideration of the following detailed description taken in connection with the accompanying drawings forming a point of this specification, with the understanding however that the invention is not confined to any strict conformity with the showing in the drawing, but may be changed and modified so long as such changes and modifications mark no material departure from the salient features of the invention as expressed in the appended claims.

In the accompanying drawing:

Figure 1 is a side view, showing the invention and a motor vehicle mounted in position ready to be tilted.

Fig. 2 is a plan showing the tilting mechanism with the motor vehicle removed.

Fig. 3 is an end view showing the tilting mechanism in dotted lines when the same is moved to its set position; and Fig. 4 is a detail view showing an attaching means for the wheels of a vehicle to the runway.

Referring now to the drawing wherein like parts designate corresponding parts throughout the several views, 5 designates the flooring or a support, and 6 the corner posts or standards secured thereto by channel irons 7' on which the tilting mechanism is mounted and operable in the manner now to be set forth in detail.

The respective end posts or standards 6 are connected by cross beams 7, 8, which support a pivotally mounted open supporting frame for the motor vehicle. The motor vehicle supporting frame is eccentrically pivoted to the cross beams 7, 8, as well as extending from one end of the said beams 7, 8, and by eccentrically pivoting the said supporting frame, so that its pivot will be to one side of its longitudinal center, the said frame will tilt sidewise when released by a holding mechanism, to be presently referred to.

The tiltable supporting frame consists of a pair of front and a pair of rear transversely extending end bars 9, 10, respectively, and the bars 9 are arranged at each side of the beam 7, and the bars 10 are arranged at each side of the beam 8. The frame further includes a pair of channel beams 13, 14, which constitute the side bars of the frame, and which provide a runway or track. The end bars 9, 10 of the frame, are pivoted to the beams 7, 8, as at 11, 12, and the pivots 11, 12, are disposed eccentrically with respect to the end bars 9, 10, and at one side of the longitudinal center of the frame, thereby providing for the sidewise tilting of the frame, when the latter is released. The beams 13, 14, which constitute the side bars of the frame, are secured to the end bars 9, 10, by suitable straps or braces 15, 16. A suitable incline or approach C is arranged at one end of the tiltable supporting frame, and is provided so that an automobile can be driven up and on to the track which is formed by the side bars of the supporting frame, and be properly positioned on the frame previous to the tilting of the latter.

Adjustable connecting elements are provided for securing the wheels of the motor vehicle to the supporting frame, and the said connecting elements are slidably mounted on the beams 13, 14, and as each of said elements is of the same construction, but one will be described, as the description of one applies to the other, and each of said elements consists of a U-shaped member 20, mounted for sliding movement on the side rail of the supporting frame, and the said member 20 has attached thereto a chain 21, and which is adapted to pass between the spokes and felly of a vehicle wheel, and after being positioned in such manner, one of the links of the chain is mounted on a hasp 22, and secured thereto, by a pin or peg 23, or other suitable means. When the connecting elements are mounted in the position stated, the vehicle is securely held on the supporting frame when the latter is tilted.

Each of the inner bars 10, above referred to, is preferably cut away, as at 25, and adapted to engage a stop 26, the inwardly bent end 27, of the bar being connected by the chain or flexible cable 28, adapted to be wound about an operating shaft 29, journaled in the standards or posts 6, said shaft being provided with a pinion 30 at one end thereof cooperating with a worm 31, rotatable by the hand wheel 32, whereby the said shaft may be rotated in either direction, to properly balance the open frame and tilt the latter, with the vehicle attached thereto, at any desired angle. Any suitable form of lock or stop 33, may be provided for engaging the pinion 30, to positively hold the gearing in position when the tilting mechanism has been once adjusted.

It will be of course understood, that various locking mechanisms for the wheels may be provided to keep the same in position, on the tracks or runway, so that the tilting mechanism may accommodate various types of motor vehicles of different lengths in positioning the same preliminary to the tilting operation. The construction is of such a nature that the same may be conveniently and easily installed in a comparatively restricted area and in such a manner that when a machine is held in position on the mechanism, and tilted, the operating parts of a vehicle may be exposed to the light so that the workman will have sufficient light and be able to move in and about the machine and not be hindered in any way to adjust or repair the same. The mechanism is extremely simple in construction, consisting of a minimum number of parts, easily assembled, rigid and durable, highly efficient in operation, practical, and capable of being manufactured at a very low cost, whereby its commercial possibilities are greatly enhanced.

In the accompanying drawings, I have illustrated my invention embodied in one form by way of example, and which in practice has been found to be highly satisfactory in obtaining the desired results. It will now be obvious however that other embodiments may be adopted, and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

What I claim is:

1. A tilting apparatus for motor vehicles and the like comprising a rigid support, a sidewise tiltable open frame eccentrically pivoted on said support and including a longitudinally extending track, slidably adjustable means for securing the wheels of a motor vehicle to the track and releasable means carried by the support and attached to the inner side of the frame for adjustably limiting the tilting movement thereof and to maintain the vehicle in various angular positions when secured on the frame.

2. A tilting apparatus for motor vehicles and the like comprising stationary posts, cross beams connecting said posts, a sidewise tiltable open frame pivoted off center on said cross beams and consisting of parallel end bars arranged on each side of the cross beams and side bars providing a track, slidable elements and chains attached thereto for securing the motor vehicle wheels to the track, and manually operable releasing means carried by certain of the posts to maintain the frame in various angular positions.

3. A tilting apparatus for motor vehicles and the like comprising front and rear stationary posts, cross beams connecting said posts, an open frame pivotally connected for sidewise tilting movement on said cross beams and mounted slightly off its center, on said beams said frame consisting of parallel bars arranged on each side of the cross beams and side bars providing a longitudinally extending track, slidable elements and chains attached to said side bars for securing the motor vehicle wheels in adjusted position on said track, the side of said frame extending beyond the outer ends of the cross beams, flexible elements connecting the inner ends of the parallel bars, an operating shaft rotatably mounted in the front and rear posts, said flexible elements being wound about said shaft, and manually operable gearing for rotating said shaft to release the flexible elements and permit the frame to be tilted to and held in various angular positions.

In testimony whereof, I affix my signature hereto.

ALBERT J. HOLLE.